(12) United States Patent
Harmatos et al.

(10) Patent No.: US 8,295,289 B2
(45) Date of Patent: Oct. 23, 2012

(54) METHOD AND SYSTEM FOR SIMULTANEOUS LOCAL AND EPC CONNECTIVITY

(75) Inventors: János Harmatos, Budapest (HU); Attila Mihaly, Dunakeszi (HU)

(73) Assignee: Telefonaktiebolaget L M Ericsson (publ.), Stockholm (SE)

( * ) Notice: Subject to any disclaimer, the term of this patent is extended or adjusted under 35 U.S.C. 154(b) by 608 days.

(21) Appl. No.: 12/511,995

(22) Filed: Jul. 29, 2009

(65) Prior Publication Data

US 2011/0026502 A1    Feb. 3, 2011

(51) Int. Cl.
*H04L 12/28* (2006.01)
(52) U.S. Cl. ........ 370/400; 370/328; 370/338; 370/352; 370/466; 370/469; 370/475
(58) Field of Classification Search .......... 370/328, 370/338, 400, 401, 466, 469, 475, 352
See application file for complete search history.

(56) References Cited

U.S. PATENT DOCUMENTS

| | | | | |
|---|---|---|---|---|
| 2006/0013192 | A1* | 1/2006 | Le et al. | 370/351 |
| 2010/0278070 | A1* | 11/2010 | Melia et al. | 370/254 |
| 2011/0026453 | A1* | 2/2011 | Yan | 370/328 |

* cited by examiner

*Primary Examiner* — Christopher Grey
(74) *Attorney, Agent, or Firm* — Potomac Patent Group PLLC

(57) ABSTRACT

A system for providing simultaneous local and global connectivity for a $3^{rd}$ generation partnership project user equipment (3GPP-UE) includes a connectivity service function (CSF) module communicating with a 3GPP-UE, a residential gateway (RGw) connected to the CSF and to consumer premises equipment (CPE) and a mobile access gateway (MAG) connected to the CSF via a level 2 (L2) tunnel, to the RGw via a broadband remote access server (BRAS) and to a packet data network gateway (PDN-GW) via a proxy mobile internet protocol (PMIP) tunnel.

14 Claims, 3 Drawing Sheets

METHOD AND SYSTEM FOR SIMULTANEOUS LOCAL AND EPC CONNECTIVITY

TECHNICAL FIELD

The present invention relates to Evolved Packet Core (EPC) and more particularly, to providing access to the EPC from a residential network environment.

BACKGROUND

There exists a need for simultaneously accessing the EPC and other customer devices (or, customer premises equipment, CPE) from a residential network environment.

A 3GPP user equipment (UE) has one IP address (i.e. it is "single-homed"). The single-homed feature helps to avoid the configuration problems on IP levels which appear if multiple IP addresses have to be handled. The 3GPP UE obtains its IP address from the EPC to communicate with the rest of the world via the EPC.

A Residential Gateway (RGw) can also assign a local IP address to the UE (to enable communication between the UE and the CPEs in the residential network for example) but EPC connectivity is not possible with this assignment. Therefore, simultaneous local (within the RGw) and global (EPC) connectivity cannot be realized. The 3GPP UE can obtain a local IP address from a Residential Gateway (RGw) and if the 3GPP UE sends a packet towards the EPC, then the RGw changes the source address (of the UE from the address) assigned by the RGw to (the address assigned by the) EPC.

This approach of having the 3GPP UE obtain an IP address from a RGw raises several issues such as the RGw having to participate in the UE-EPC communication and the RGw, which is a non-3GPP device, obtaining the IP address assigned to the 3GPP-UE (by the EPC) which impacts 3GPP standardization and may also cause security/authentication problems in EPC.

Other issues include the need for Internet Protocol (IP) level processing in the RGw of each packet sent towards the EPC. It is therefore, preferable for the 3GPP-UE to obtain the IP address from the EPC. This leads to a problem in local communication because the IP subnet of the 3GPP-UE differs from the IP subnet of the other devices (e.g. CPEs) in a residential network.

The user equipment (UE) is non-tunneled which means that there is no tunnel between the UE and any other network element (both fixed access network and 3GPP core network). User packets are not encrypted so the quality of service (QoS) information is not hidden from the intermediate network elements. As a result, end-to-end QoS can be guaranteed.

There are currently three proposed alternatives in $3^{rd}$ Generation Partnership Project (3 GPP) on attaching a 3 GPP UE to a 3 GPP EPC through a non-3GPP access network. While an exact technical definition of trusted and un-trusted has not been finalized as yet, "trusted" is used if there is no Internet Protocol Security (IPSec) tunnel between the UE and the 3GPP core and "un-trusted" is used if a tunnel is established.

The first alternative, S2a, is used for trusted non-3GPP access and Proxy Mobile Internet Protocol (PMIP) mobility protocol is used (network-based mobility). The second alternative, S2b, is used for un-trusted non-3GPP access and PMIP mobility protocol is used. The third alternative, S2c, includes both trusted and un-trusted non-3GPP access variants and DSMIP (dual stack MIP, a client based MIP which supports both IPv4 and IPv6) is used for mobility (client-based mobility).

As described above, since the UE is non-tunneled and single-homed, the first alternative, S2a interface is used with PMIP (network-based) mobility protocol. In PMIP, Mobility Access Gateway (MAG) handles the mobility related signalling instead of the Mobile Node (MN). All mobility related actions are hidden from the MN and the MN can always use its Home Address (since the MN is on the home link).

MN should have IP processing since this is the end node. According to the PMIP specification, the MAG should be the first IP hop towards the destination if the packet originates in a MN (which means that IP level processing cannot take place in the RGw). Normally, RGw performs the IP level processing. In order to address these issues, some alternatives are available.

The RGw needs to be the MAG itself (the MAG function is implemented in the MN) or has to provide a direct level 2 (L2) connection towards the network entity MAG (when the RGw is not the MAG). Having the RGw being the MAG is not preferred as such approach requires an operator-controlled device being placed in a user's home. This raises security questions (e.g. attacks to the operator's network) and authentication related questions. Furthermore, the huge number of MAGs may cause scalability problems. In the latter case (i.e. where the RGw is not the MAG), the MAG is placed somewhere in (fixed) access network and the RGw needs to provide a tunnel towards the MAG.

While reaching EPC from a non-3GPP access network has been specified in the standard, simultaneous local and EPC connectivity is not addressed since 3GPP deals only with EPC related issues. Alternative solutions that exist for providing simultaneous local and EPC connectivity have an impact on 3GPP standardization. Each of these solutions has some drawbacks.

The UE may be multi-homed: in this case, the local IP address could be used for local connectivity and global (EPC) IP address can be used for reaching the EPC. However, simultaneous local and global connectivity cannot be provided using the current 3GPP standards; therefore, modifications are required in the 23.402 specification.

The UE may be single homed, but it could obtain its IP address from the RGw. Local address cannot be used for providing connectivity to EPC due to the resulting security and technical problems highlighted above.

The UE may be tunnelled, which means that an IPSec tunnel can be established to the EPC. In addition to the multi-homed related problems, in this case a tunnel is always established which does not conform to the S2a interface. If S2a needs to be supported, the 3GPP 23.402 specification may be impacted.

Each of these possible solutions impacts standardization (attachment processes and/or interface specifications), the UE and/or the fixed network entities.

SUMMARY

In one embodiment, a system for providing simultaneous local and global connectivity for a $3^{rd}$ generation partnership project user equipment (3GPP-UE) is disclosed. The system comprises: a connectivity service function (CSF) module connected to the 3GPP-UE; a residential gateway (RGw) connected to the CSF and to consumer premises equipment (CPE); and a mobile access gateway (MAG) connected to the CSF via a level 2 (L2) tunnel, to the RGw via a broadband remote access server (BRAS) and to a packet data network gateway (PDN-GW) via a proxy mobile internet protocol (PMIP) tunnel.

In another embodiment, a method for providing simultaneous local and global connectivity is disclosed. The method comprises: receiving a data packet from a 3$^{rd}$ generation partnership project user equipment (3GPP-UE); determining a destination of the packet, the destination being one of a residential gateway or a mobile access gateway; changing the source and destination address as needed based on the determined destination; and transmitting the packet via a corresponding interface.

BRIEF DESCRIPTION OF THE DRAWINGS

The various features, advantages, and objects of this invention will be understood by reading this description in conjunction with the drawings, in which.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

In exemplary embodiments, the MAG may be placed somewhere in the network and the RGw Layer 2 may provide connectivity between the MAG and the UE. An Ethernet packet from the MN may be carried up to the MAG. This may be generally realized by tunnelling since there is no direct Ethernet (L2) connection between the MN and the MAG placed in the network.

Exemplary embodiments include providing novel functionalities in the Residential Network using a Connectivity Service Function (CSF). The functionalities are based on a combination and application of existing, standardized solutions with novel, special functions. Exemplary embodiments can be implemented into any RGw by a software upgrade or as new hardware. Exemplary embodiments as described herein are consistent with standardization and therefore, do not impact standardization or user equipment.

The 3GPP UE may be connected to the CSF, which tunnels the packets destined to the EPC to the MAG and switches the local traffic to the RGw. Tasks handled by the CSF may include: (1) providing PMIP transparent operation Layer 2 connectivity for the 3GPP UE to access the MAG; and (2) providing simultaneous local and global connectivity in which the device connectivity (both local and global), IP addressing, UPnP operation and broadcast and multicast can work in a standardized way.

The PMIP transparent operation may be provided by using Layer 2 Tunnelling Protocol (L2TP) by establishing a L2TP tunnel between the CSF and the MAG. An improved NAT mechanism, combined with packet inspection (L2 and L3) function may facilitate handling of address management.

A CSF in residential network may be implemented as a (I) standalone device in some embodiments and (II) embedded in the RGw in other embodiments.

I. Standalone Embodiment

In some embodiments, the CSF may be implemented as a separate, standalone hardware device (such as a "dongle" equipment) which may be developed for performing specific tasks needed for providing local and global connectivity for a 3GPP UE.

Figure 1:
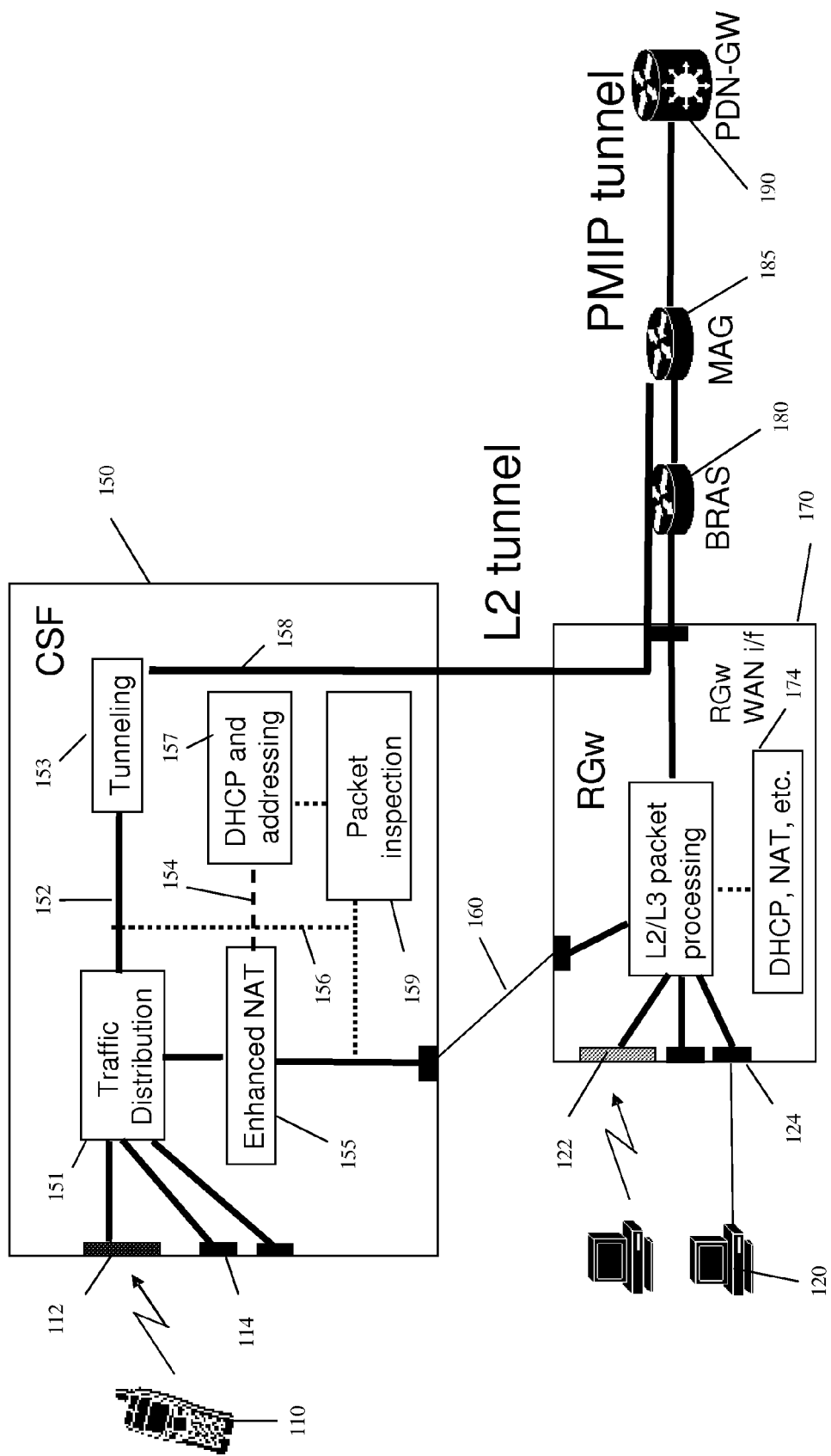
FIG. 1 illustrates a residential network environment in accordance with an exemplary embodiment.

As illustrated in FIG. 1, the 3GPP UEs 110 may be connected to CSF 150 device using WLAN interface 112. Alternatively, a wired physical interface 114 can also be used. CSF device can be connected to RGw 170 using connection 160 which may represent Ethernet, wireless or USB connectivity.

CPEs 120 in the Residential network may be connected to WLAN interface 122 or to wired Ethernet interface 124 of RGw 170.

If CPEs communicate with external devices (i.e. any devices on the internet reached via the fixed infrastructure and Broadband Remote Access Server or BRAS), then CSF 150 need not be included in the operation; the existing RGw functions may be used (such as network address translation or NAT, DHCP server, ALG, packet inspection, etc.). That is, CSF 150 only has a role if a 3GPP UE wants to communicate with an external device—other devices in the residential network may be handled by the RGw.

In case of local 3GPP UE-CPE communication, layer 2 packets may be forwarded to CSF which performs the required processing on the packets. A 3GPP UE communicates directly with the CSF while the packets of other devices in the residential network (such as CPEs for example) which are destined to the 3GPP UE may be sent to the RGw and the RGw forwards the packets to the CSF.

The CSF may include multiple parts/modules for providing traffic distribution (151), tunnelling (153), enhanced NAT function (155), DHCP and addressing (157) and packet inspection (159).

The control plane of the tunnelling module 153 may provide tunnel establishment while the user plane may perform the encapsulation of the L2 packets. The traffic distribution module 151 may determine that the current packet has to be tunnelled or has to be forwarded to the RGw 170. The CSF 150 (utilizing the DHCP and addressing module 157) may obtain an IP address from the RGw local address space (that may be located in RGw 170) which may be used for supporting local communication of the 3GPP UE 110. The DHCP and addressing module 157 may perform the required DHCP functions as well as the address management functions as described below. The DHCP function performs all address obtaining operations while the addressing function stores information that is required for 1-1 address mapping described below.

The enhanced NAT function (eNAT) module 155 may perform 1-1 address switching between the 3GPP UE's global IP address (obtained from EPC) and local address (handled by the DHCP and addressing module 157) in case of local communication. The packet inspection module 159 may perform the required investigation of packets to select those packets that should be processed and/or modified by other modules as described further below.

Solid lines 152 of FIG. 1 indicate the paths of the packets (e.g. after traffic distribution tunnelling towards MAG 185 or forwarded towards RGw 170). Dashed line 154 between DHCP and addressing module 157 and enhanced NAT module 155 indicates that if a change in the source and/or destination address is required in the current packet, then the eNAT module 155 gathers the required information. The eNAT function requires information for the 1-1 address switching between the 3GPP UE's global IP address (obtained from the EPC) and local address (handled by the DHCP and addressing module 157). The 1-1 mapping may be stored in the addressing module.

Dotted lines 156 originating from packet inspection module 159 indicate that packets on all interfaces have to be inspected because some actions (like packet blocking, generating a DHCP request towards the DHCP server of the RGw as described below) are triggered by packet header information (e.g. IP address). For this reason, there is also a connection between inspection module 159 and addressing module 157.

Tunnel Establishment

When a 3GPP UE 110 attaches (attach in this context means that the 3GPP UE builds up an association with the EPC including authentication, authorization, bearer establishment, IP addressing, etc.) or performs a handover to the EPC using the (fixed) non-3GPP infrastructure, the UE may be connected to the CSF device 150 and tunnelling module 153 of CSF 150 may initiate establishment of a L2TP tunnel 158 towards the predefined MAG 185.

The MAG can be configured in CSF 150 or in RGw 170. It could be placed in one of the BNG (Broadband Network Gateway) or in the fixed operator. For providing security, the standardized control plane function of L2TP tunnel establishment (user name/password based authentication) can be used which guarantees that only an authenticated CSF can be connected to the MAG. Since the L2TP tunnel establishment is independent from both the fixed network and EPC operators, there is no restriction regarding the ownership of MAG (it can be in the hand of a third party operator having a business relation with EPC operator for example).

Alternatively, establishment of the L2TP tunnel 158 need not be based on the 3GPP UE attachment 110. In this case, the L2TP tunnel may be pre-established when CSF 150 is turned on and connected to RGw 170 (via wired or wireless Ethernet or USB connection 160).

Using the L2TP authentication and authorization, the non-3GPP access can be assumed as trusted, so S2a interface (trusted non-3GPP access with network-based PMIP mobility) can be used. The procedure by which the UE and the EPC agree on the usage of S2a interface is standardized in 3GPP.

Address Management

When the L2 connection is established between a UE and the CSF, the UE initiates and performs the authentication and authorization process to the EPC. That is, first, a layer 2 (e.g. an Ethernet level) connectivity may be established between the UE and the CSF. However, the UE has no L3 connectivity (no IP address). After the UE attaches to the CSF on L2, the CSF starts the AAA (authentication, authorization and accounting) process towards the EPC. The establishment of the L2 tunnel between the CSF and the MAG may be triggered by this AAA process.

After this phase (i.e., the establishment of IP connectivity between the UE and the EPC, obtaining an IP address from the EPC) is completed, the L3 attach may be triggered and the UE may send a DHCP request towards the DHCP server in the EPC. The CSF may recognize (using packet inspection) that this is a DHCP message from the given 3GPP UE and may forward the message to the L2 tunnel.

Upon establishment of a PMIP tunnel between MAG 185 and PDN-GW 190 (acting as LMA—local mobility anchor) and assignment of an IP address to the UE, the MAG may send a DHCP acknowledgement message to the UE. The PDN-GW 190 (the LMA in this context) in the EPC represents an anchor point for the UE and is the point of presence (PoP) of the UE. The DHCP acknowledgement message contains the IP address assigned to the UE, which will be used as home address and a subnet prefix specifying the home subnet of the UE. When the CSF recognizes this DHCP message, the CSF may pick up the message and may perform the following steps:

(1) A DHCP request message is sent (by the DHCP and addressing module 157) to the DHCP server 174 of the RGw to obtain an IP address from the RGw address space. This address will be handled only by the CSF and used for emulating towards the other equipment that the 3GPP UE has a local IP address. There will be a one-to-one mapping between the global and local address of a given UE.

(2) Since simultaneous and seamless global and local connectivity has to be provided for the 3GPP UE, it also has to be emulated that the UE's home subnet (provided by the EPC) and the local subnet (provided by the RGw) are the same. The seamless global and local connectivity can be provided if the CSF extends the subnet size of the home subnet of the UE with the size of the local subnet (size of the residential network, specified by the address space of the RGw). For example, if a home subnet with /27 prefix is assigned to the UE and the local subnet has /26 prefix, then CSF 150 may modify the original /27 prefix to /25, enabling that the "virtual" subnet of UE 110 can contain all devices from the UE's home subnet (EPC) and the residential network. This modified home network prefix is included in the DHCP acknowledgement message and sent to the UE by the CSF. The CSF then generates the following routing entries in its routing table: (i) If the UE sends a packet matching the /27 prefix (i.e. the destination address belongs to the UE's home prefix), then the packet is tunnelled and sent to MAG 185; (ii) If the UE sends a packet matching the /25 excluding /27 prefix (i.e. the packets with destination addresses matching the residential network address space), then the packet is processed by the CSF (sent to the eNAT module) and forwarded to the RGw; (iii) In case of all other destination addresses (e.g. a third party machine somewhere on the internet), the packet is tunnelled and sent to the MAG (EPC). The IP PoP of the UE is anchored to the PDN-GW 190 in the EPC.

(3) To emulate that all CPEs are in the UE's home subnet, an additional step is needed. For all CPEs in the residential network, the CSF has to maintain a 1-1 mapping between the IP address of a given CPE and an IP address from the UE's extended home subnet (this latter IP address is selected from the /25 excluding the /27 prefix space).

(4) If two or more 3GPP UEs are communicating in the residential network, the above steps (i.e. steps 1 to 3) are the same, but the advertised subnet to UEs could be larger (shorter prefix—such as /24 or /23 in this case), because the CSF has to provide the connectivity between any two UEs which means that the advertised subnet size has to cover the size of the residential network (/26 prefix in the example) and the number of active 3GPP UEs. The different 3GPP UEs may have different home subnets in EPC, these subnets are not shared by each other. It means that the emulated subnet by the CSF for a 3GPP UE contains the UE's home subnet in EPC, the residential network and the other 3GPP UEs which are connected to the CSF (if any).

Global (EPC) Connectivity

If the UE sends a packet destined to its EPC home subnet or any external address, the traffic distribution function of the CSF determines—based on the routing table—that this packet has to be tunnelled and no further processing is needed. In case of downlink traffic, no CSF interaction is needed.

Local Connectivity

If the UE communicates with a CPE on the residential network and the destination address matches the /26 prefix, this specifies that the packet should be forwarded to the RGw after processing. The following processing mechanism may be performed:

The CSF eNAT function picks up the packet and changes the source and destination IP addresses from the global IP address to the local IP address of the 3GPP UE and the corresponding CPE, respectively. Then the modified packet is forwarded to the RGw and switched to the local LAN.

If a CPE sends a packet to the 3GPP UE, then the mechanism is the opposite: The RGw sends the packet towards the CSF (based on standard MAC learning functionality), which performs the change of the source and the destination address to the address allocated for the CPE from the extended home subnet of the UE (/25 prefix) and the global address of the UE respectively and sends the packet to the corresponding UE.

Two 3GPP UEs may be communicating with each other locally. In this case, the eNAT function recognizes, based on the destination address, that the destination device is another 3GPP UE and not a CPE. Therefore, the source address will be changed to an address from destination UE's extended home subnet address space. The packet is handled only by the CSF equipment; the RGw is not involved in the 3GPP UE to 3GPP UE communication. In case of reverse packet forwarding, the mechanism works in reverse.

If two CPEs communicate with each other, the CSF is not involved in the communication process which is handled by the L2 packet processing module of the RGw.

Connectivity to Fixed Core

The 3GPP UE may also communicate with the fixed core network or reaches external destinations via the fixed core. In this case, the CSF is configured so that a given external destination address space is forwarded towards the EPC using the L2 tunnel while other address space can be reached via the DSL interface. In order to perform this, an additional routing entry is placed in the routing table to specify which external destination address can be reached via the EPC (packet is L2 tunneled to the MAG) and which address space can be reached via the fixed core network. In the latter case, the CSF changes the source address to the local one, forwards the packets to the RGw where the packets are handled as a packet originated to a device from the residential network (the packet is subjected to NAT, etc).

Address Resolution Protocol (ARP) Message Handling

If a 3GPP UE sends out an ARP message and the IP address belongs to the residential network address space, the CSF recognizes that this packet contains an ARP message using packet inspection. CSF changes the source address; the address to be resolved is also changed to the corresponding address by the eNAT module (a corresponding link layer Ethernet address is found for a given IP address).

One of the tasks of eNAT module 155 of CSF 150 is to handle the ARP messages. Normally if a computer sends out an ARP message with a (destination) IP address, then the computer with the (destination) IP address will send a reply with its link layer address. However, it works only on a single subnet. Here, since two subnets are present (one for 3GPP UE and another for residential network), eNAT module 155 of CSF 150 provides or sends the reply instead of the computer.

The modified ARP message may then be forwarded towards the RGw. The ARP response (or reply) message may be processed by the eNAT module and the packet may be forwarded to the UE.

If a 3GPP UE's address (local address, which is used for intra residential network communication) needs to be resolved by a CPE, then the request is handled by the CSF. The CSF detects that this is an ARP message, investigates the address to be resolved and recognizes that the address belongs to a 3GPP UE. The CSF generates a new ARP request and multicasts it on the subnet of the given 3GPP UE and when the IP address is resolved, the CSF assembles the ARP response message for the original request.

This procedure is also applicable if a 3GPP UE wants to resolve the IP address of another 3GPP UE.

If a CPE wants to resolve the IP address of another CPE, the CSF recognizes (using the packet inspection module) that no 3GPP UE interaction is needed. As a result, the incoming ARP message is blocked by the CSF and not forwarded towards the 3GPP UE(s).

II. Embedded Embodiment

In some embodiments, the control service function (CSF) may be implemented in the residential Gateway. A RGw may include hardware functions for realizing the control service function. The CSF may also be realized as a software solution.

Figure 2:
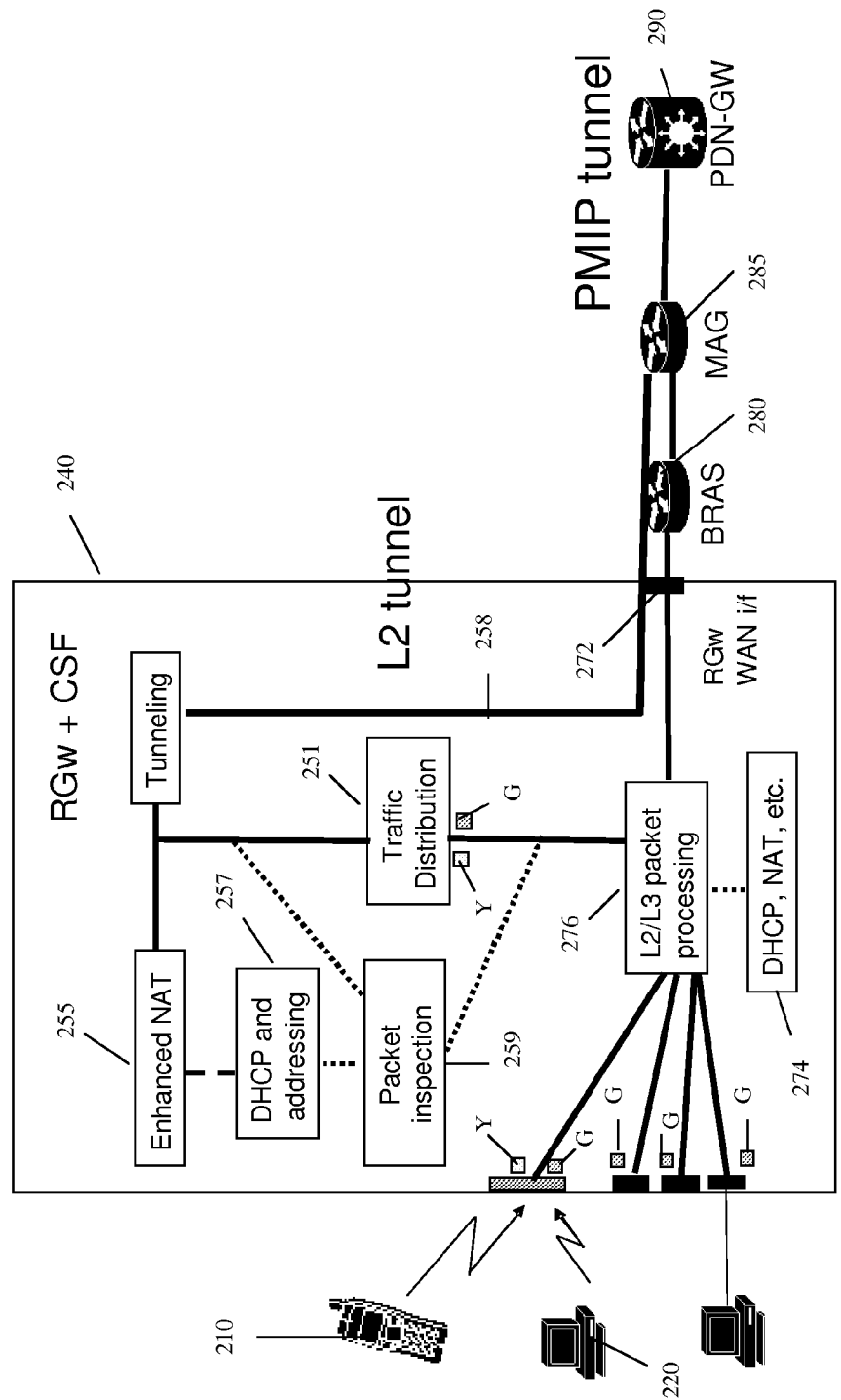
FIG. 2 illustrates a residential network environment in accordance with an alternate embodiment.

The main functional parts and the operation of the CSF are similar in the embedded embodiment as in the standalone embodiment described above. The traffic handling differs (from the standalone embodiment) as the WLAN interface of the RGw may be utilized by being shared between the 3GPP UE(s) 210 and other CPE(s) 220 in the residential network as illustrated in FIG. 2. A traffic distribution module 251 may determine which packets go to the connectivity service function (CSF) for further processing and which packets are to be handled by the RGw bridge based on the destination address as described above with respect to the standalone embodiment (and repeated below).

The packets with destination addresses matching the residential network address space may be sent to the RGw. If the destination address belongs to the UE's home prefix, then the packet may be tunnelled and sent to the MAG (EPC). In case of any other destination address (e.g. a third party machine somewhere on the internet) the packet may be tunnelled and sent to the MAG (EPC) 285. The IP PoP of the UE is anchored to the PDN-GW 290 in the EPC.

Exemplary embodiments as described herein use virtual LAN (VLAN) based traffic separation. Different VLAN_ids may be defined for the 3GPP devices 210 and the CPEs 220. The VLAN_id with "Y" indicates that the traffic is originating from or is destined to the 3GPP UE 210, while that with "G" indicates that the traffic is originating from or destined to a CPE 220.

When a packet with a CPE VLAN_id arrives at RGw, on the basis of the destination L2 (Ethernet) address, the packet is forwarded to the CSF or handled by the RGw L2 bridge 258 (the forwarding being based on standard MAC learning process).

When the packet has a 3GPP UE VLAN_id, the packet is forwarded to the CSF for further processing.

All processing mechanisms are similar to those described above with respect to the standalone embodiment, but in addition to the address changes, the CSF may change the VLAN_id according to the destination device as follows: if it is a local 3GPP UE, then the 3GPP VLAN_id is used; if it is a local CPE, then the CPE VLAN_id is used; if it is an external device, then the VLAN_id is removed and the packet is tunnelled; and if it is en external address, which is reached via the fixed network, then the CPE VLAN_id is used and the packet is forwarded to the RGw for further L3 processing.

All CPE and 3GPP UEs as well as the RGw have to support VLAN tagging of Ethernet frames indicating that these devices have to be IEEE 802.1Q compliant devices.

Exemplary embodiments provide connectivity between a 3GPP UE and the EPC from a residential network environment. Simultaneous local and global connectivity of the 3GPP UE are facilitated.

The standalone embodiment can be effectively used as a solution to extend the functionality of current RGws for handling 3GPP UEs. This realization can be attractive for mobile operators to offer a new service for their customers as being able to reach the EPC from a residential network environment using fixed network infrastructure.

The embedded embodiment enables the operators (both mobile and fixed network operators) to offer a device (and/or a service), which makes it possible to reach EPC from residential network environment using the fixed network infrastructure.

Figure 3:
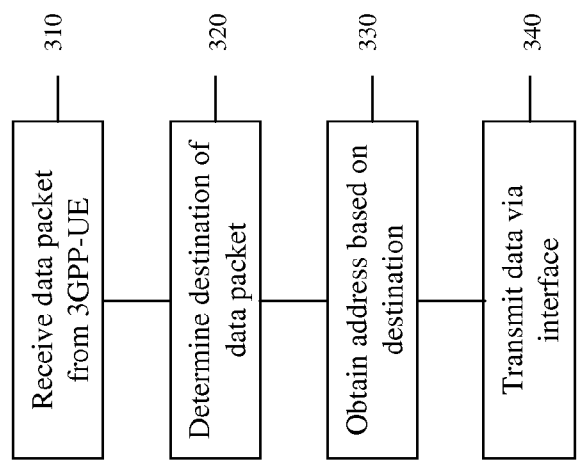
FIG. 3 illustrates a method in accordance with exemplary embodiments.

A method in accordance with exemplary embodiments may be described with reference to FIG. 3. A data packet may be received from a $3^{rd}$ generation partnership project user equipment (3GPP-UE) at 310. A determination may be made as to the destination of the packet at 320. The destination may be a residential gateway (local address) or a mobile access gateway (global address). The address (source and destination) may be changed as needed if, for example, the UE is attempting to communicate with a CPE on the residential network (local address) at 330. The packet may be transmitted via a corresponding interface (interface 160 to RGw or L2 tunnel) at 340.

Additional advantages include: providing security by the L2 tunnel; providing mobility using the standards described by the 3GPP (TS2.402); ability to use separate MAG equipment: the MAG can be handled by the fixed or mobile operator, or even a third party operator.

In terms of efficiency, no extra functions are required and no IPSec tunnelling is needed in the UE which results in lower power consumption. Since IPSec tunnelling is not used, the tunnelling overhead need not be carried by the network.

It is expected that this invention can be implemented in a wide variety of environments. It will also be appreciated that procedures described above may be carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

It is emphasized that the terms "comprises" and "comprising", when used in this application, specify the presence of stated features, integers, steps, or components and do not preclude the presence or addition of one or more other features, integers, steps, components, or groups thereof.

Thus, this invention may be embodied in many different forms, not all of which are described above, and all such forms are contemplated to be within the scope of the invention. The particular embodiments described above are merely illustrative and should not be considered restrictive in any way. The scope of the invention is determined by the following claims, and all variations and equivalents that fall within the range of the claims are intended to be embraced therein.

APPENDIX I

List of abbreviations and acronyms used in the description:
ALG Application Layer Gateway
ARP Address Resolution Protocol
CSF Connectivity Service Function
CPE Customer Premise Equipment
DHCP Dynamic Host Configuration Protocol
EPC Evolved Packet Core L2TPLayer 2 Tunneling Protocol
MAG Mobility Access Gateway
NAT Network Address Translation
PDN-GW Packet Data Network Gateway
PMIP Proxy Mobile IP
RGw Residential Gateway
UE User Equipment
WLAN Wireless Local Area Network
3GPP $3^{rd}$ Generation Partnership Project

The invention claimed is:

1. A system for providing simultaneous local and global connectivity for generation partnership project user equipment (3GPP-UE) comprising:
    a connectivity service function (CSF) module in communication with the 3GPP-UE;
    a residential gateway (RGw) connected to the CSF and to consumer premises equipment (CPE); and
    a mobile access gateway (MAG) connected to the CSF via a level 2 (L2) tunnel, to the RGw via a broadband remote access server (BRAS) and to a packet data network gateway (PDN-GW) via a proxy mobile internet protocol (PMIP) tunnel.

2. The system of claim 1, wherein the 3GPP-UE communicates with the CSF via one of a wide area local area network (WLAN) or a wired physical interface.

3. The system of claim 1, wherein the CSF module is connected to the RGw via one of an Ethernet, a universal serial bus (USB) or a wireless interface.

4. The system of claim 1, wherein the CPEs are connected to the RGw via one of a WLAN interface or an Ethernet.

5. The system of claim 1, wherein the CSF further comprises:
    a traffic distribution module;
    a tunnelling module;
    an enhanced network addressing translation (eNAT) module;
    a dynamic host configuration protocol (DHCP) and addressing module; and
    a packet inspection module.

6. The system of claim 5, wherein the traffic distribution module determines the destination of a packet from the 3GPP-UE, the destination being one of the residential gateway or the mobile access gateway via the tunnel.

7. The system of claim 6, wherein an IP address is obtained from a RGw local address space for supporting local communication of the 3GPP-UE.

8. The system of claim 7, wherein local communication is with a CPE.

9. The system of claim 6, wherein an IP address is obtained from an evolved packet core (EPC) for supporting global communication of the 3 GPP-UE.

10. The system of claim 5, wherein the traffic inspection module inspects all packets from the traffic distribution module.

11. The system of claim 5 where the DHCP and addressing module maintains 1-1 mapping information between a local address and a global address of the 3GPP-UE.

12. The system of claim 5, wherein the eNAT module gathers information if a change is required in at least one of the source and destination address of a packet being processed.

13. The system of claim 12, wherein the address is changed between a global IP address of the 3GPP-UE and a local address.

14. The system of claim 1, wherein the CSF extends a subnet size of a home subnet of the 3GPP-UE to include the local subnet.

* * * * *

UNITED STATES PATENT AND TRADEMARK OFFICE
CERTIFICATE OF CORRECTION

PATENT NO. : 8,295,289 B2
APPLICATION NO. : 12/511995
DATED : October 23, 2012
INVENTOR(S) : János Harmatos and Attila Mihaly It is certified that error appears in the above-identified patent and that said Letters Patent is hereby corrected as shown below:

In column 10, line 23 (in claim 1), between "for" and "generation", please insert -- $3^{rd}$ --.

Signed and Sealed this
Twenty-sixth Day of March, 2013

Teresa Stanek Rea
*Acting Director of the United States Patent and Trademark Office*